United States Patent
Kraft et al.

(10) Patent No.: US 7,499,913 B2
(45) Date of Patent: Mar. 3, 2009

(54) METHOD FOR HANDLING ANCHOR TEXT

(75) Inventors: Reiner Kraft, Gilroy, CA (US); Andreas Neumann, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 471 days.

(21) Appl. No.: 10/764,801

(22) Filed: Jan. 26, 2004

(65) Prior Publication Data
US 2005/0165781 A1    Jul. 28, 2005

(51) Int. Cl.
G06F 7/00    (2006.01)
(52) U.S. Cl. .............................. 707/3; 707/5
(58) Field of Classification Search .......... 707/2–6, 707/10
See application file for complete search history.

(56) References Cited

U.S. PATENT DOCUMENTS

| | | | |
|---|---|---|---|
| 4,965,763 A | 10/1990 | Zamora | |
| 5,187,790 A | 2/1993 | East et al. | |
| 5,265,221 A | 11/1993 | Miller | |
| 5,287,496 A | 2/1994 | Chen et al. | 707/203 |
| 5,297,039 A | 3/1994 | Kanaegami et al. | |
| 5,574,906 A | 11/1996 | Morris | 707/1 |
| 5,638,543 A | 6/1997 | Pedersen et al. | |
| 5,685,003 A | 11/1997 | Peltonen et al. | 715/531 |
| 5,701,469 A | 12/1997 | Brandli et al. | 707/102 |
| 5,708,825 A | 1/1998 | Sotomayor | |
| 5,721,938 A | 2/1998 | Stuckey | |
| 5,721,939 A | 2/1998 | Kaplan | |
| 5,724,033 A | 3/1998 | Burrows | 341/76 |
| 5,729,730 A | 3/1998 | Wlaschin et al. | |
| 5,745,889 A | 4/1998 | Burrows | 707/2 |
| 5,745,890 A | 4/1998 | Burrows | 707/3 |
| 5,745,894 A | 4/1998 | Burrows et al. | 707/5 |
| 5,745,898 A | 4/1998 | Burrows | 707/101 |
| 5,745,899 A | 4/1998 | Burrows | 707/102 |
| 5,745,900 A | 4/1998 | Burrows | 707/102 |
| 5,745,904 A | 4/1998 | King et al. | 707/200 |
| 5,745,906 A | 4/1998 | Squibb | 707/203 |
| 5,765,149 A | 6/1998 | Burrows | 707/5 |
| 5,765,150 A | 6/1998 | Burrows | 707/5 |
| 5,765,158 A | 6/1998 | Burrows | 707/101 |

(Continued)

FOREIGN PATENT DOCUMENTS

EP    0 809 197    11/1997

(Continued)

OTHER PUBLICATIONS

Macurious Software Foundation. *Macurious Spider Frequently Asked Questions 3.0* [online] [retrieved on Oct. 8, 2003]. Available from http://www.macurious.com/spider/faq.htm.

(Continued)

*Primary Examiner*—Wilson Lee
(74) *Attorney, Agent, or Firm*—Janaki Davda; Konrad Raynes & Victor LLP

(57) ABSTRACT

Disclosed is a method for processing anchor text for information retrieval. A set of anchors that point to a target document is formed. Anchors with same anchor text are grouped together. Information is computed for each group. Context information is generated for the target document based on the computed information.

8 Claims, 6 Drawing Sheets

U.S. PATENT DOCUMENTS

| | | | |
|---|---|---|---|
| 5,765,168 A | 6/1998 | Burrows | 707/200 |
| 5,787,435 A | 7/1998 | Burrows | 707/102 |
| 5,797,008 A | 8/1998 | Burrows | 707/101 |
| 5,809,502 A | 9/1998 | Burrows | 707/7 |
| 5,832,480 A * | 11/1998 | Byrd et al. | 707/5 |
| 5,832,500 A | 11/1998 | Burrows | 707/103 R |
| 5,832,519 A | 11/1998 | Bowen et al. | 707/203 |
| 5,852,820 A | 12/1998 | Burrows | 707/2 |
| 5,862,325 A | 1/1999 | Reed et al. | |
| 5,864,863 A | 1/1999 | Burrows | 707/103 R |
| 5,873,097 A | 2/1999 | Harris et al. | 707/203 |
| 5,884,305 A | 3/1999 | Kleinberg et al. | |
| 5,890,103 A | 3/1999 | Carus | |
| 5,893,119 A | 4/1999 | Squibb | 707/203 |
| 5,903,646 A | 5/1999 | Rackman | |
| 5,903,891 A | 5/1999 | Chen et al. | 707/10 |
| 5,909,677 A | 6/1999 | Broder et al. | |
| 5,914,679 A | 6/1999 | Burrows | 341/76 |
| 5,915,251 A | 6/1999 | Burrows et al. | 707/102 |
| 5,920,859 A * | 7/1999 | Li | 707/5 |
| 5,933,822 A | 8/1999 | Braden-Harder et al. | |
| 5,963,940 A | 10/1999 | Liddy et al. | |
| 5,963,954 A | 10/1999 | Burrows | 707/102 |
| 5,966,703 A | 10/1999 | Burrows | 707/2 |
| 5,966,710 A | 10/1999 | Burrows | 707/103 R |
| 5,970,497 A | 10/1999 | Burrows | 707/102 |
| 5,974,412 A | 10/1999 | Hazlehurst et al. | |
| 5,995,980 A | 11/1999 | Olson et al. | 707/201 |
| 6,005,503 A | 12/1999 | Burrows | 341/67 |
| 6,016,493 A | 1/2000 | Burrows | 707/101 |
| 6,016,501 A | 1/2000 | Martin et al. | 707/203 |
| 6,021,409 A | 2/2000 | Burrows | 707/102 |
| 6,026,388 A | 2/2000 | Liddy et al. | |
| 6,026,413 A | 2/2000 | Challenger et al. | 707/202 |
| 6,029,165 A | 2/2000 | Gable | |
| 6,035,268 A | 3/2000 | Carus et al. | |
| 6,047,286 A | 4/2000 | Burrows | 707/4 |
| 6,067,543 A | 5/2000 | Burrows | 707/4 |
| 6,078,914 A * | 6/2000 | Redfern | 707/3 |
| 6,078,916 A * | 6/2000 | Culliss | 707/5 |
| 6,078,923 A | 6/2000 | Burrows | 707/101 |
| 6,088,694 A | 7/2000 | Burns et al. | 707/8 |
| 6,105,019 A | 8/2000 | Burrows | 707/2 |
| 6,119,124 A | 9/2000 | Broder et al. | |
| 6,182,062 B1 * | 1/2001 | Fujisawa et al. | 707/3 |
| 6,182,121 B1 | 1/2001 | Wlaschin | |
| 6,192,258 B1 * | 2/2001 | Kamada et al. | 455/566 |
| 6,192,333 B1 | 2/2001 | Pentheroudakis | |
| 6,205,451 B1 | 3/2001 | Norcott et al. | 707/204 |
| 6,205,456 B1 | 3/2001 | Nakao | |
| 6,216,175 B1 | 4/2001 | Sliger et al. | 707/169 |
| 6,233,571 B1 | 5/2001 | Egger et al. | 707/2 |
| 6,243,713 B1 | 6/2001 | Nelson et al. | 707/104.1 |
| 6,243,718 B1 | 6/2001 | Klein et al. | 707/203 |
| 6,269,361 B1 | 7/2001 | Davis et al. | |
| 6,278,992 B1 | 8/2001 | Curtis et al. | 707/3 |
| 6,285,999 B1 | 9/2001 | Page | |
| 6,295,529 B1 | 9/2001 | Corston-Oliver et al. | |
| 6,308,179 B1 | 10/2001 | Petersen et al. | |
| 6,324,566 B1 | 11/2001 | Himmel et al. | |
| 6,336,117 B1 | 1/2002 | Massarani | 707/100 |
| 6,339,772 B1 | 1/2002 | Klein et al. | 707/4 |
| 6,374,268 B1 | 4/2002 | Testardi | 707/205 |
| 6,381,602 B1 | 4/2002 | Shoroff et al. | |
| 6,385,616 B1 | 5/2002 | Gardner | 707/10 |
| 6,418,433 B1 | 7/2002 | Chakrabarti et al. | 707/5 |
| 6,421,655 B1 | 7/2002 | Horvitz et al. | |
| 6,463,439 B1 | 10/2002 | Dahlberg | 707/100 |
| 6,519,592 B1 | 2/2003 | Getchius et al. | |
| 6,519,593 B1 | 2/2003 | Matias et al. | 707/7 |
| 6,519,597 B1 | 2/2003 | Cheng et al. | 707/10 |
| 6,542,906 B2 | 4/2003 | Korn | 707/203 |
| 6,547,829 B1 | 4/2003 | Meyerzon et al. | |
| 6,553,385 B2 | 4/2003 | Johnson et al. | |
| 6,567,804 B1 | 5/2003 | Ramasamy et al. | 707/4 |
| 6,578,032 B1 | 6/2003 | Chandrasekar et al. | |
| 6,584,458 B1 | 6/2003 | Millett et al. | 707/3 |
| 6,594,682 B2 | 7/2003 | Peterson et al. | |
| 6,615,209 B1 | 9/2003 | Gomes et al. | |
| 6,618,725 B1 | 9/2003 | Fukuda et al. | |
| 6,622,211 B2 | 9/2003 | Henry et al. | |
| 6,631,369 B1 | 10/2003 | Meyerzon et al. | |
| 6,631,496 B1 | 10/2003 | Li et al. | |
| 6,633,872 B2 | 10/2003 | Ambrosini et al. | |
| 6,643,650 B1 | 11/2003 | Slaughter et al. | |
| 6,658,406 B1 | 12/2003 | Mazner et al. | |
| 6,658,423 B1 | 12/2003 | Pugh et al. | |
| 6,665,657 B1 | 12/2003 | Dibachi | |
| 6,678,409 B1 | 1/2004 | Wu et al. | |
| 6,754,873 B1 | 6/2004 | Law et al. | |
| 6,763,362 B2 | 7/2004 | McKeeth | |
| 6,766,316 B2 | 7/2004 | Caudill et al. | |
| 6,789,077 B1 | 9/2004 | Slaughter et al. | |
| 6,810,375 B1 | 10/2004 | Ejerhed | |
| 6,839,665 B1 | 1/2005 | Meyers | |
| 6,839,702 B1 | 1/2005 | Patel et al. | |
| 6,839,843 B1 | 1/2005 | Bacha et al. | |
| 6,842,730 B1 | 1/2005 | Ejerhed et al. | |
| 6,845,009 B1 | 1/2005 | Whitted | |
| 6,850,979 B1 | 2/2005 | Saulpaugh et al. | |
| 6,865,575 B1 | 3/2005 | Smith et al. | |
| 6,868,447 B1 | 3/2005 | Slaughter et al. | |
| 6,870,095 B1 | 3/2005 | Whitted | |
| 6,877,136 B2 | 4/2005 | Bess et al. | |
| 6,904,454 B2 * | 6/2005 | Stickler | 709/213 |
| 6,906,920 B1 | 6/2005 | Whitted | |
| 6,934,634 B1 | 8/2005 | Ge | |
| 7,031,954 B1 | 4/2006 | Kirsch | |
| 7,051,023 B2 * | 5/2006 | Kapur et al. | 707/5 |
| 2001/0027451 A1 | 10/2001 | Taguchi et al. | |
| 2001/0049671 A1 | 12/2001 | Joerg | |
| 2002/0032705 A1 | 3/2002 | Higashiyama et al. | |
| 2002/0065957 A1 | 5/2002 | Rubin | |
| 2002/0099723 A1 | 7/2002 | Garcia-Chiesa | |
| 2002/0120685 A1 | 8/2002 | Srivastava et al. | |
| 2002/0129014 A1 | 9/2002 | Kim et al. | |
| 2002/0129015 A1 | 9/2002 | Caudill et al. | |
| 2002/0165707 A1 | 11/2002 | Call | |
| 2002/0169770 A1 * | 11/2002 | Kim et al. | 707/5 |
| 2002/0174149 A1 | 11/2002 | Conroy et al. | |
| 2002/0188615 A1 | 12/2002 | Latarche et al. | |
| 2003/0028564 A1 | 2/2003 | Sanfilippo | |
| 2003/0046311 A1 | 3/2003 | Baidya et al. | |
| 2003/0055626 A1 | 3/2003 | Miyahira et al. | |
| 2003/0093409 A1 | 5/2003 | Weil et al. | |
| 2003/0163454 A1 | 8/2003 | Jacobsen et al. | |
| 2003/0177127 A1 | 9/2003 | Goodwin et al. | |
| 2003/0182282 A1 | 9/2003 | Ripley | |
| 2003/0187833 A1 | 10/2003 | Plu | |
| 2003/0217052 A1 | 11/2003 | Rubenczyk et al. | |
| 2003/0225763 A1 | 12/2003 | Guilak et al. | |
| 2003/0225779 A1 | 12/2003 | Matsuda | |
| 2003/0229604 A1 | 12/2003 | Zaragoza et al. | |
| 2004/0078356 A1 | 4/2004 | Mazner et al. | |
| 2004/0078753 A1 | 4/2004 | Doyle | |
| 2004/0111408 A1 | 6/2004 | Caudill et al. | |
| 2004/0123104 A1 | 6/2004 | Boyen et al. | |
| 2004/0162997 A1 | 8/2004 | Hopmann et al. | |
| 2004/0215606 A1 * | 10/2004 | Cossock | 707/3 |
| 2004/0243554 A1 | 12/2004 | Broder et al. | |
| 2004/0243556 A1 | 12/2004 | Ferrucci et al. | |
| 2004/0243557 A1 | 12/2004 | Broder et al. | |
| 2004/0243560 A1 | 12/2004 | Broder et al. | |
| 2004/0243581 A1 * | 12/2004 | Weissman et al. | 707/9 |

| | | | |
|---|---|---|---|
| 2004/0243645 | A1 | 12/2004 | Broder et al. |
| 2005/0044411 | A1 | 2/2005 | Somin et al. |
| 2005/0120004 | A1 | 6/2005 | Stata et al. |
| 2005/0149499 | A1 | 7/2005 | Franz et al. |
| 2005/0149576 | A1 | 7/2005 | Marmaros et al. |
| 2005/0149851 | A1 | 7/2005 | Mittal |
| 2005/0198076 | A1 | 9/2005 | Stata et al. |
| 2006/0047825 | A1 | 3/2006 | Steenstra et al. |
| 2006/0074962 | A1 | 4/2006 | Fontoura et al. |
| 2007/0271268 | A1 | 11/2007 | Fontoura et al. |
| 2007/0282829 | A1 | 12/2007 | Fontoura et al. |

FOREIGN PATENT DOCUMENTS

| | | |
|---|---|---|
| EP | 0809197 A2 | 11/1997 |
| JP | 10289246 | 10/1998 |
| JP | 10293767 | 11/1998 |
| JP | 2000339309 | 12/2000 |
| WO | 9749048 | 12/1997 |
| WO | WO-97/49048 | 12/1997 |

OTHER PUBLICATIONS

Miscellaneous Articles from Newsgroups, Available from: (1) Newsgroups:google.public.support.general; Date: Jul. 5, 2002 and Jul. 6, 2002; (2) Newsgroups: comp.protocols.tcp-ip.domains; Date Apr. 8, 2000; (3) Newsgroups: micorsoft.public.frontpage.client; Date: Mar. 18, 1999 [3 entries] Mar. 19, 1999 and (4) Newsgroups:alt. internet.search-engines; Date: Jan. 26, 2002.

Kaindl. H., et al., "*Combining Structure Search and Content Search for the World-Wide Web*," 1998 ACM, ISBN 0-89791-972-6-06/1998, pp. 217-224.

Weinreich, H., et al.. "*The Look of the Link—Concepts for the User Interface of Extended Hyperlinks*," 2001, ACM ISBN 1-59113-420—Jul. 1, 2001, pp. 19-28.

Dieberger, A. "*Context Lenses—Document Visualization and Navigation Tools for Rapid Access to Detail.*" In Human-Computer Interaction INTERACT '01. IFIP TC. 13 International Conference on Human-Computer Interaction, Jul. 9-13, 2001, Tokyo, Japan, IOS Press. Title page, copyright page and article (pp. 545-552).

Hardman, L. "*Links in Hypermedia: the Requirement for Context.*" 5th ACM Conference on Hypertext, '93 Proceedings, pp. 183-191.

Baeza-Yates, R. and B. Ribeiro-Neto. "*Modern Information Retrieval.*" England: Pearson Education Limited, 1999, title page, copyright page, table of contents (ix-xvi), and Chapter 8 "Indexing and Searching" (pp. 191-199, 222-228, 382-384).

Lipyeow, L. et al. "*Dynamic Maintenance of Web Indexes Using Landmarks,*" 10 pages. WWW2003, May 20-24, 2003, Budapest, Hungary. ACM. Available from http:// citreseer.nj.nec.com/590376. html.

Zobel, J. et al. "*In-Memory Hash Tables for Accumulating Text Vocabularies,*" pp. 1-9. Information Processing Letters, vol. 80, No. 6, pp. 271-277, 2001. Available from http://citeseer.nj.nec.com/529586.html.

Brown, E. et al. "*Execution Performance Issues in Full-Text Information Retrieval.*" Technical Report 95-81, Oct. 1995. Computer Science Department, Amherst, MA (Ph.D. Thesis), 179 pages. Available from http://citeseer.nj.nec.com/brown95execution.html.

Brown, E. et al. "*Fast Incremental Indexing for Full-Text Information Retrieval*," pp. 1-11. Proceedings of the 20th VLDB Conference, pp. 192-202, Santiago, Chile, 1994. Available from http://citeseer.nj.nec.com/brown94fast.html.

Agarwal, R.C. "*A Super Scalar Sort Algorithm for RISC Processors,*" pp. 240-246. Proceedings of the 1996 ACM SIGMOD International Conference on Management of Data, 1996. Available from http://citeseer.nj.nec.com/agarwal96super.html.

Arpaci-Dusseau, A.C. et al. "*High Performance Sorting on Networks of Workstations,*" 12 pages. Proceedings of the 1996 ACM SIGMOD International Conference on Management of Data, 1997. Available from http://portal.acm.org/citation.cfm?id=253322&coll=portal&dl=ACM&CFID=13536765&CFTOKEN=64334274.

Clarke, C.L.A., et al. "*Shortest Substring Ranking (MultiText Experiments for TREC-4)*," pp. 1-10. Proceedings of the Fourth Text Retrieval Conference, Nov. 1995. Available from http://citeseer.nj. nec.com/84012.html.

Tomasic, A. et al. "*Performance of Inverted Indices in Shared-Nothing Distributed Text Document Information Retrieval Systems,*" 11 pages. Proceedings of the 2nd International Conference on Parallel and Distributed Information Systems, Jan. 1983url=.

Melnik, S. et al. "*Building a Distributed Full-Text Index for the Web,*" 10 pages, 2001. In *World Wide Web*, pp. 396-406. Available from http:// citeseer.nj.nec.com/long03optimized.html.

Long, X and T. Suel. "*Optimized Query Execution in Large Search Engines with Global Page Ordering,*" 12 pages. Proceedings of the 29th VLDB Conference, Berlin, Germany, 2003. Available from http://citeseer.nj.nec.com/long03optimized.html.

Callan, J.P et al. "*The INQUERY Retrieval System,*" 9 pages. Proceedings =DEXA}-92, 3rd International Conference on Database and Expert Systems Applications, pp. 78-83, 1992. Available from http:// citeseer.nj.nec.com/26307.html.

Pearson, P.K. "*Fast Hashing of Variable Length Text Strings,*" pp. 677-680. Communications of the ACM, Jun. 1990, vol. 33, No. 6.

Witten, I.H., et al. "*Managing Gigabytes. Compressing and Indexing Documents and Images.*" San Francisco: Morgan Kaufmann Publishers, 1999, title page, copyright page, table of contents (v-xi) and Chapter 5 "Index Construction" (pp. 223-261).

Corme, T.H., et al. "*Introduction to Algorithms.*" Cambridge: The MIT Press, Second Edition, 2003, title page, copyright page, table of contents (v-xi) and Chapter 8 "Sorting in Linear Time" (pp. 165-177).

Sedgewick, R. "*Algorithms in C++. Parts 1-4.*" Boston: Addison-Wesley Publishing Co., 1998. title page, copyright page, table of contents (xv-xix) and Chapter 10 "Radix Sorting" (pp. 417-433, 436-450).

U.S. Appl. No. 10/764,771, filed Jan. 26, 2004, entitled *Method, System, and Program for Handling Redirects in a Search Engine*, by M. F. Fontoura, et al.

U.S. Appl. No. 10/764,800, filed Jan. 26, 2004, entitled *Architecture for an Indexer*, by M. F. Foutoura, et al.

U.S. Appl. No. 10/764,772, filed Jan. 26, 2004, entitled *A Pipelined Architecture for Global Analysis and Index Building*, by M. F. Foutoura, et al.

Lu, W, L. Chien, & H. Lee, "Anchor Text Mining for Translation of Web Queries", *Proceedings from the International Conference on Data Mining*, Nov. 2001, pp. 401-408.

PCT International Search Report and Written Opinion, May 6, 2005, for International Application No. PCT/EP2005/050321.

Agrawal, S., S. Chaudhuri and G. Das, "DBXplorer: A System for Keyword-Based Search over Relational Databases," Proceedings of 18th International Conference on Data Engineering, 2002, 12 pp.

Agrawal, S., S. Chaudhuri and G. Das, "DBXplorer: Enabling Keyword Search over Relational Databases", Proceedings of the 2002 ACM SIGMOD International Conference on Management of Data, 2002, p. 627.

Bhalotia, G., A. Hulgeri, C Nakhe, S. Chakrabarti and S. Sudarshan, "Keyword Searching and Browsing in Databases Using BANKS", Proceedings of the 18th International Conference on Data Engineering, 2002, 10 pp.

Brin, S. and L. Page, "The Anatomy of a Large-Scale Hypertextual Web Search Engine", Computer Networks and ISDN Systems, vol. 30, No. 1-7, 1998, pp. 107-117.

Broder, A.Z., D. Carmel, M. Herscovichi, A. Soffer and J. Zien, "Efficient Query Evaluation Using a Two-Level Retrieval Process", Twelfth International Conference on Information Knowledge Management (CIKM 2003), 2003, pp. 426-434.

Broder, A.Z., S.C. Glassman, M.S. Manasse, and G. Zweig, "Syntactic Clustering of the Web", Computer Networks and ISDN Systems, vol. 29, Iss. 8-13, 1997, pp. 1157-1166.

Bruno, N., K. Koudas and D. Srivastava, "Holistic Twig Joins: Optimal XML Pattern Matching", Proceedings of the 2002 ACM SIGMOD International Conference on Management of Data, 2002, pp. 310-321.

Carmel, D., Y. Maarek, M. Mandelbrod, Y. Mass and A. Soffer, "Searching XML Documents via XML Fragments," Proceedings of the 26th Annual International ACM SIGIR Conference on Research and Development in Information Retrieval, 2003, pp. 151-158.

Fontoura, M., E. Shekita, J. Zien, S. Rajagopalan and A. Neumann, "High Performance Index Build Algorithms for Intranet Search Engines", Proceedings of 30th International Conference on Very Large Data Bases, 2004, pp. 1158-1169.

French, G., "Hacking the Google Numrange Operator", [online], Apr. 1, 2004, [retrieved on Aug. 31, 2004]. retrieved from the Internet at <URL: http://www.webpronews.com/insiderreports/searchinsider/wpn-49-20040401HackingtheGoogleNumrangeOperator.html>.

Google, "Advanced Search", [online], 2003, [retrieved on Aug. 31, 2004], retrieved from the Internet at <URL: http://www.google.com/help/refinesearch.html>.

Gravano, L., P.G. Ipeirotis, N. Koudas and D. Srivastava, "Text Joins in an RDBMS for Web Data Integration", Proceedings of the 12th International Conference on World Wide Web, 2003, pp. 90-101.

Guttman, A., "R-Trees: A Dynamic Index Structure for Spatial Searching", Proceedings of the 1984 ACM SIGMOD International Conference on Management of Data, 1984, pp. 47-57.

Hristidis, V. and Y. Papakonstantinou, "DISCOVER: Keyword Search in Relational Databases", Proceedings of the 28th VLDB Conference, 2002, 12 pp.

Kaushik, R., R. Krishnamurthy, J.F. Naughton and R. Ramakrishnan, "On the Integration of Structure Indexes and Inverted Lists," Proceedings of the 20th International Conference on Data Engineering, 2004, 1 pg.

Melnik, S., S. Raghavan, B. Yang and H. Garcia-Molina, "Building a Distributed Full-Text Index for the Web," ACM Transactions on Information Systems, vol. 19, No. 3, Jul. 2001, pp. 217-241.

Press, W.H., B.P. Flannery, S.A. Teukolsky and W.T. Vetterling, "Numerical Recipes in C: The Art of Scientific Computing", 1998, Ch. 9, pp. 258-263.

Raghavan, S. and H. Garcia-Molina, "Complex Queries over Web Repositories", Proceedings of the 29th VLDB Conference, 2003, pp. 33-44.

Raghavan, S. and H. Garcia-Molina, "Integrating Diverse Information Management Systems: A Brief Survey", IEEE Data Engineering Bulletin, 2001, vol. 24, No. 4, pp. 44-52.

Ramsak, F., V. Markl, R. Fenk, M. Zirkel, K. Elhardt and R. Bayer, "Integrating the UB-Tree into a Database System Kernel", Proceedings of 26th International Conference on Very Large Data Bases, Sep. 2000, pp. 263-272.

Spertus, E. and L.A. Stein, "Squeal: A Structured Query Language for the Web", Proceedings of the 9th international World Wide Web Conference on Computer Networks, 2000, pp. 95-103.

U.S. Appl. No. 11/182,334, filed Jul. 14, 2005, entitled "Enforcing Native Access Control to Indexed Documents", invented by R. Lempel, T. Leyba, J.A. McPherson, Jr., and J.L. Perez.

U.S. Appl. No. 11/295,397, filed Dec. 5, 2005, entitled "Improving Text Search Quality by Exploiting Organizational Information", invented by T. Hampp, M. Baessler, A. Lang, T.W. Goetz, A. Baader, and J. Doerre.

Lomet, D. (Ed.), "Bulletin of the Technical Committee on Data Engineering", Dec. 2001, vol. 24, No. 4, 56 pp.

PCT International Search Report and Written Opinion for Serial No. PCT/EP2006/064281, mailed Oct. 30, 2006.

EP Office Action, Dec. 28, 2007, for EP Application No. 05701609.9-2201, 6 pp.

Lu, W., L. Chien, & H. Lee, "Anchor Text Mining for Translation of Web Queries", Proceedings of the IEEE International Conference on Data Mining, 2001, pp. 401-408.

Lu, Z. "Scalable Distributed Architectures for Information Retrieval", Dissertation, May 1999, Department of Computer Science, University of Massachusetts Amherst, 194 pp.

Tomasic, A., H. Garcia-Molina, and K. Shoens, "Incremental Updates of Inverted Lists for Text Document Retrieval". Nov. 18, 1993, Department of Computer Science, Stanford University, pp. 1-43.

* cited by examiner

METHOD FOR HANDLING ANCHOR TEXT

BACKGROUND OF THE INVENTION

1. Field of the Invention

The present invention is related to handling anchor text for information retrieval.

2. Description of the Related Art

The World Wide Web (also known as WWW or the "Web") is a collection of some Internet servers that support Web pages that may include links to other Web pages. A Uniform Resource Locator (URL) indicates a location of a Web page. Also, each Web page may contain, for example, text, graphics, audio, and/or video content. For example, a first Web page may contain a link to a second Web page. When the link is selected in the first Web page, the second Web page is typically displayed.

A Web browser is a software application that is used to locate and display Web pages. Currently, there are billions of Web pages on the Web.

Web search engines are used to retrieve Web pages on the Web based on some criteria (e.g., entered via the Web browser). That is, Web search engines are designed to return relevant Web pages given a keyword query. For example, the query "HR" issued against a company intranet search engine is expected to return relevant pages in the intranet that are related to Human Resources (HR). The Web search engine uses indexing techniques that relate search terms (e.g., keywords) to Web pages.

An anchor may be described as a link or path to a document (e.g., a URL). Anchor text may be described as text associated with a path or link (e.g., a URL) that points to a document. For example, anchor text may be text that labels or encloses hypertext text links in Web documents. Anchor text is collected by Web search engines and is associated with target documents. Also, the anchor text and target documents are indexed together.

Web search engines use context information (e.g., title, summary, language, etc.) to enrich search results. This provides a user with screened search results. Anchor text, however, may not be relevant for use as context information. For example, anchor text may be in a different language than the target document, and use of the anchor text without further processing may result in, for example, a Japanese title for an English document. Moreover, anchor text may not be related to the content of the document. For instance, anchor text may contain common words (e.g., "Click here") that occur often and are used primarily for navigation, but which do not have any meaningful value as a title. Also, anchor text may be inaccurate, impolite or may contain slang, (e.g., an anchor to a "Network Security Guide" has anchor text "Looking for Trouble?").

Moreover, generation of context information is especially difficult when the contents of a Web page can not be retrieved (e.g., due to server outage, incompleteness of the retrieval of Web pages for processing by the search engine, robots.txt prohibiting access) or when a document is retrieved but cannot be analyzed (e.g., because the file is a video/audio/multimedia file, is in an unknown or unsupported format, is ill-formed or is password protected).

Most search engines display only a Uniform Resource Locator (URL) in the absence of content of a Web page. That, however, makes it hard for the user to capture the usefulness of a search result without looking at the Web page itself.

Thus, there is a need for improved document processing to provide context information for documents, such as Web pages.

SUMMARY OF THE INVENTION

Provided are a method, system, and program for processing anchor text. A set of anchors that point to a target document is formed. Anchors with same anchor text are grouped together. Information is computed for each group. Context information is generated for the target document based on the computed information.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Certain implementations of the invention make a document available for searching by indexing anchor text instead of or in addition to content. Certain implementations generate context information from the anchor text of anchors that point to a document. For instance, at least a portion of anchor text may be designated as a title or a summary of the document. However, it may be difficult to identify meaningful anchor text because anchor text may be in a different language than the target document, anchor text may not be related to the content of the document, or anchor text may be inaccurate, impolite or may contain slang. Furthermore, special care is taken to remove noise in the anchor text that does not have meaningful value as, for example, a title (e.g., URLs, file names, navigational text such as "next column").

Thus, certain implementations of the invention process raw anchor text to obtain high quality titles and summaries. Certain implementations of the invention distill raw anchor text to obtain high quality data that can be used for generating title or summary data for search result items. The result of the raw anchor text processing improves the overall search quality and, therefore, user experience in a document retrieval system.

Figure 1:
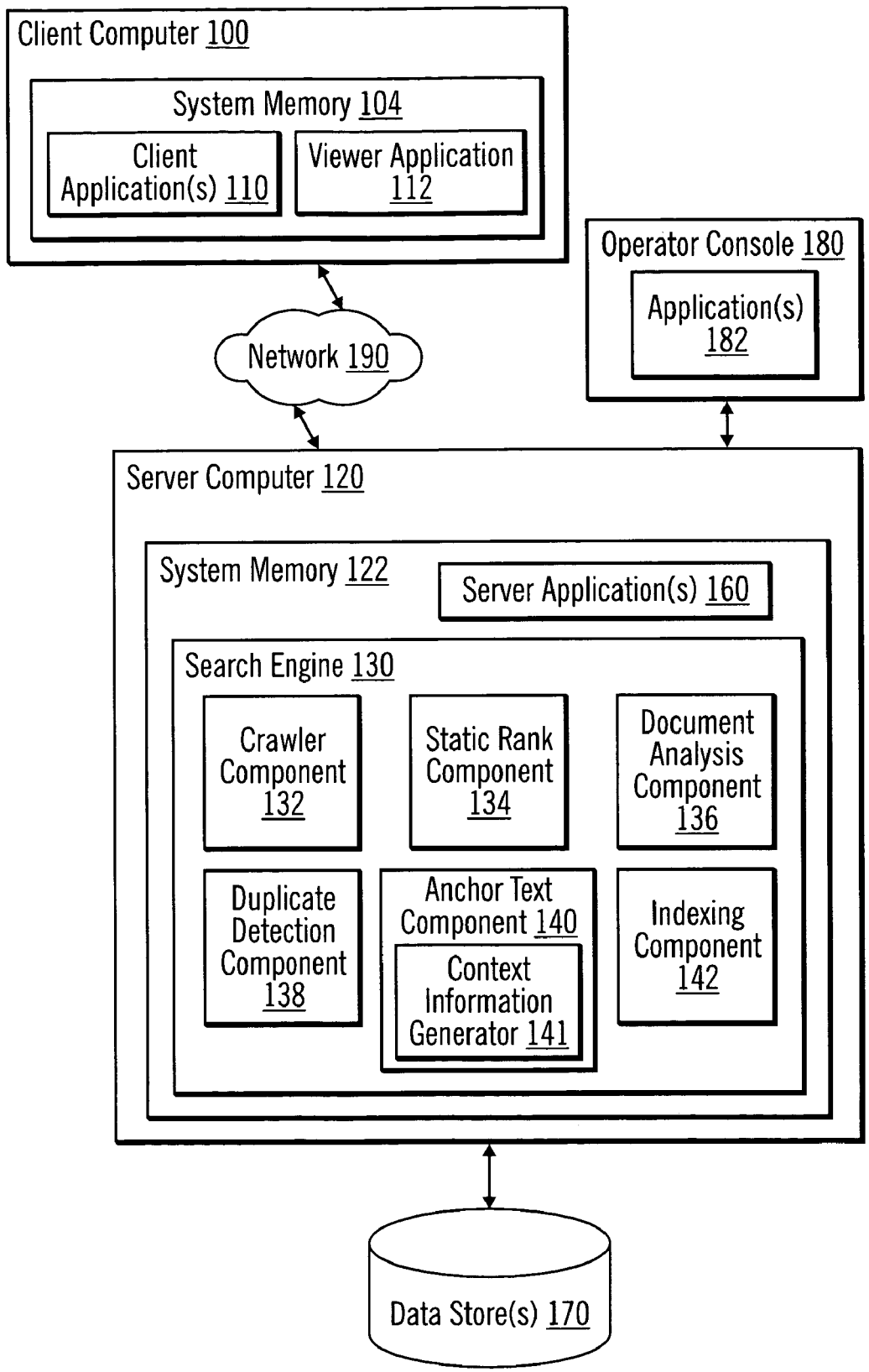
FIG. 1 illustrates, in a block diagram, a computing environment in accordance with certain implementations of the invention.

FIG. 1 illustrates, in a block diagram, a computing environment in accordance with certain implementations of the invention. A client computer 100 is connected via a network 190 to a server computer 120. The client computer 100 may comprise any computing device known in the art, such as a server, mainframe, workstation, personal computer, hand held computer, laptop telephony device, network appliance, etc. The network 190 may comprise any type of network, such as, for example, a Storage Area Network (SAN), a Local Area Network (LAN), Wide Area Network (WAN), the Internet, an Intranet, etc. The client computer 100 includes system memory 104, which may be implemented in volatile and/or non-volatile devices. One or more client applications 110 and a viewer application 112 may execute in the system memory 104. The viewer application 112 provides an interface that enables searching of a set of documents (e.g., stored in one or more data stores 170. In certain implementations, the viewer application 112 is a Web browser.

The server computer 120 includes system memory 122, which may be implemented in volatile and/or non-volatile devices. A search engine 130 executes in the system memory 122. In certain implementations, the search engine includes a crawler component 132, a static rank component 134, a document analysis component 136, a duplicate detection component 138, an anchor text component 140, and an indexing component 142. The anchor text component 140 includes a context information generator 141. Although components 132, 134, 136, 138, 140, 141, and 142 are illustrated as separate components, the functionality of components 132, 134, 136, 138, 140, 141, and 142 may be implemented in fewer or more or different components than illustrated. Additionally, the functionality of the components 132, 134, 136, 138, 140, 141, and 142 may be implemented at a Web application server computer or other server computer that is connected to the server computer 120. Additionally, one or more server applications 160 execute in system memory 122.

The server computer 120 provides the client computer 100 with access to data in at least one data store 170 (e.g., a database). Although a single data store 170 is illustrated, for ease of understanding, data in data store 170 may be stored in data stores at other computers connected to server computer 120.

Also, an operator console 180 executes one or more applications 182 and is used to access the server computer 120 and the data store 170.

The data store 170 may comprise an array of storage devices, such as Direct Access Storage Devices (DASDs), Just a Bunch of Disks (JBOD), Redundant Array of Independent Disks (RAID), virtualization device, etc. The data store 170 includes data that is used with certain implementations of the invention.

Figure 2:
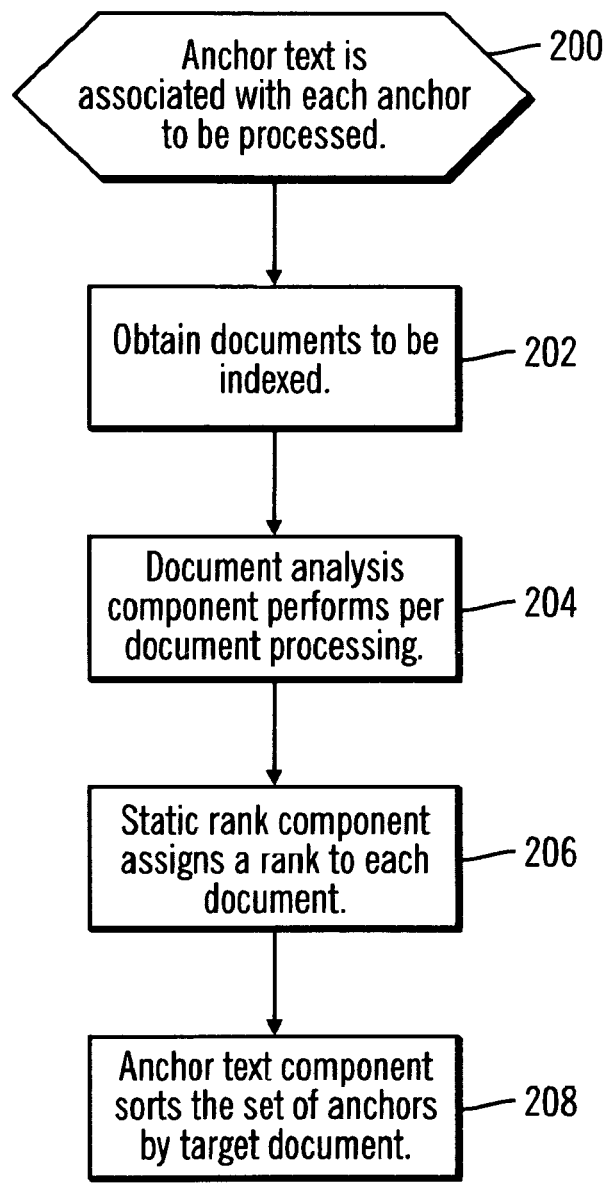
FIG. 2 illustrates logic implemented to prepare anchors for processing in accordance with certain implementations of the invention.

FIG. 2 illustrates logic implemented to prepare anchors for processing in accordance with certain implementations of the invention. Control begins at block 200 with anchor text being associated with each anchor. This may be done, for example, by each user who creates an anchor. An anchor may be described as a path or link (e.g., a URL) from a source document to a target document.

In block 202, documents that are to be indexed by the search engine 130 are obtained. In certain implementations, the documents are published or pushed (e.g., as may be the case with newspaper articles) to the indexing component 142. In certain implementations, the crawler component 132 discovers, fetches, and stores the documents. In certain implementations, the crawler component 132 may discover documents based on, for example, certain criteria (e.g., documents were accessed within the last month). Additionally, the crawler component 132 may discover documents in one or more data stores connected directly (e.g., data store 170) or indirectly (e.g., connected to server computer 120 via another computing device (not shown)) to server computer 120. In certain implementations, the crawler component 132 discovers, fetches, and stores Web pages in data store 170. These stored documents may be referred to as a "collection of documents".

In block 204, the document analysis component 136 performs per document analysis. In particular, the document analysis component 136 reviews the stored documents, parses and tokenizes the documents, and determines, for each document, the language in which each document was written, extracts anchor text, and performs other tasks such as, categorization and classification of the documents. The language information is stored for later use. For example, the document analysis component 136 determines whether the primary language used in the document is English, Japanese, German, etc. As part of extracting the anchor text, the document analysis component 136 also associates a proximity class with each anchor. A proximity class may be described as specifying how close a source document is to a target document (e.g., whether they are on the same server, and if so, whether they are in the same directory). Also, the extracted anchor text is ready to be processed by the anchor text component 140.

In block 206, the static rank component 134 reviews the stored documents and assigns a rank to the documents. The rank may be described as the importance of the source document relative to other documents that have been stored by the crawler component 132. Any type of ranking technique may be used. For example, documents that are accessed more frequently may receive a higher rank.

In block 208, the context information generator 141 sorts the anchors by target document. This results in the set of anchors for a target document being grouped together in a set for further processing. Each set is separately processed for each target document, as will be described with reference to FIGS. 3A and 3B.

Figure 3A:
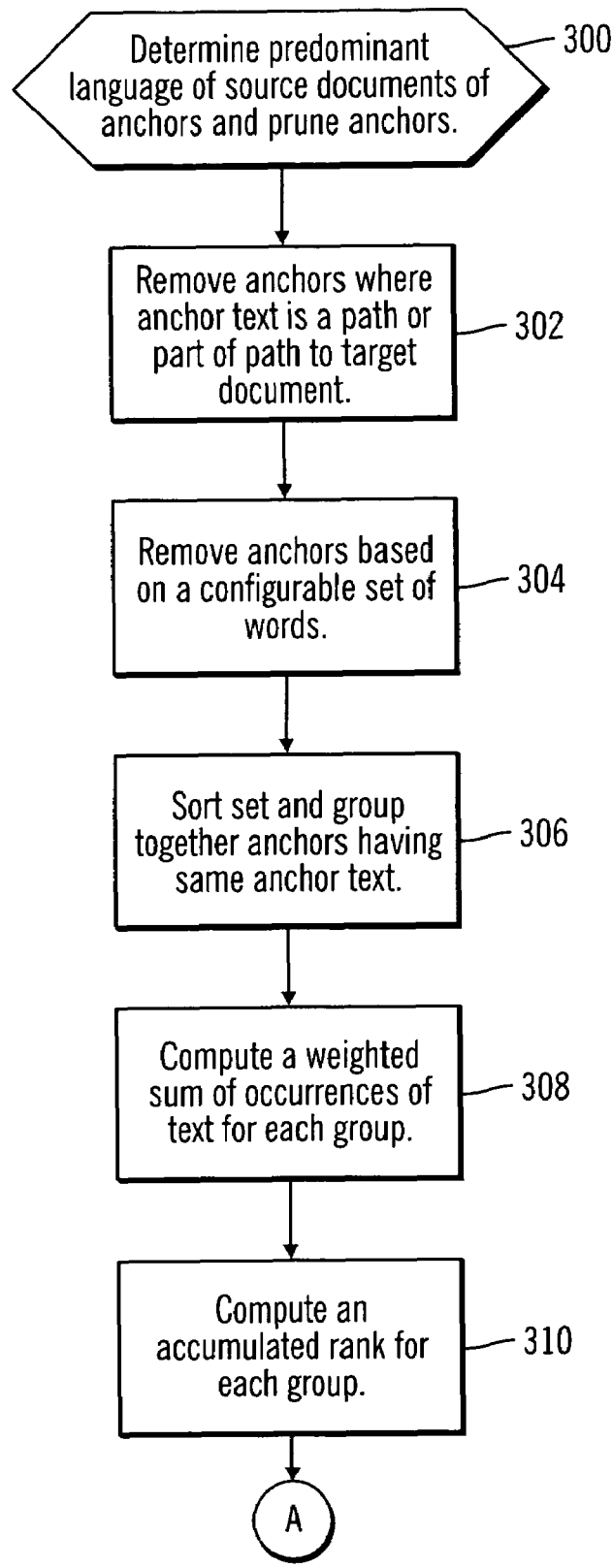
FIGS. 3A and 3B illustrate logic implemented to process anchor text in accordance with certain implementations of the invention.
Figure 3B:
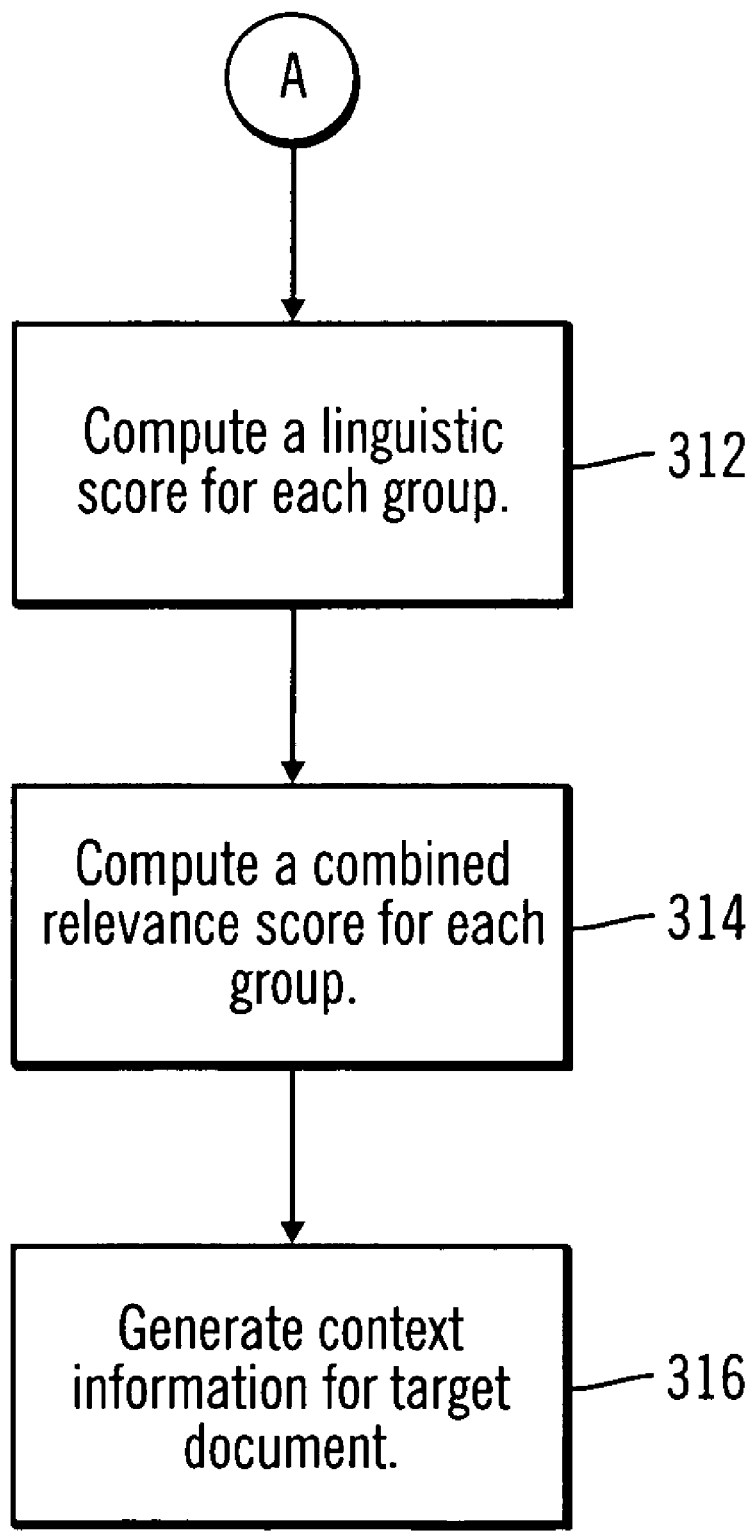

FIGS. 3A and 3B illustrate logic implemented to process anchor text in accordance with certain implementations of the invention. Control begins at block 300 with the context information generator 141 determining a predominant language of the source documents of the anchors pointing to the target document in the set of anchors for the target document. In certain implementations, if more than a configurable percentage of source documents have the same language, anchors from the set whose source document language is different from the predominant language are removed. A configurable percentage may be described as a percentage that may be modified by, for example, a system administrator or another application program.

In block 302, the context information generator 141 removes anchors that have anchor text that contains a path (e.g., URL) or a portion of a path to the target document. In block 304, the context information generator 141 removes anchor text based on whether and in which order or combination the anchor text contains words from a configurable set of words (e.g., anchor text that contains only words from the configurable set, that contains at least a number of words from the configurable set or contains words from the configurable set in a certain order may be removed). The configurable set of words may be, for example, determined by a system administrator. For example, the configurable set of words may include stop words, such as "click here" or "the".

In block 306, the context information generator 141 sorts the set of anchors by anchor text and groups together anchors having the same anchor text. In block 308, the context information generator 141 computes a weighted sum of occurrences of the text for each group. The weight of each individual occurrence of the text may be determined by the proximity class of the anchor. For example, if a first document has a proximity class A, a second document has a proximity class B, and a third document has proximity class C, and classes A, B and C have weight 10, 5, and 2 respectively, the weighted sum is 17.

In block 310, the context information generator 141 computes an accumulated rank for each group. That is, each anchor in the group contributes to this rank according to the rank of its source document and its proximity class. For example, if a first document has a proximity class A, a second document has a proximity class B, and a third document has proximity class C, and classes A, B and C have weight 10, 5, and 2 respectively, if the first, second and third documents have static ranks 9, 13, and 16, respectively, and if the accumulated rank is computed by weighted average, the accumulated rank is (9*10+13*5+16*2)/(10+5+2)=187/17=11. Other techniques of computing accumulated rank include minimum, maximum, or both of these in combination with preferring the ranks of one proximity class over the others, etc.

In block 312, the context information generator 141 computes a linguistic score for each group. In certain implementations, this score may be computed by a linguistic analysis of the text that scores the text for displayability as a title. For example, displayability as a title may be determined by considering the number of words in the text (e.g., a title should be brief), further linguistic analysis of the text, statistical analysis of each word or the number of occurrences of the words in all anchors in the set of anchors that point to a target document or the similarity of the anchor to the content of the target document when the target document is available for access.

In block 314, the context information generator 141 computes a combined relevance score from the weighted sum of occurrences, the accumulated static rank, and the linguistic score for each group.

In block 316, the context information generator 141 generates context information for the target document. In certain implementations, the context information generator 141 selects the text of the group with the highest combined relevance score as a pseudo-title, composes an anchor-based static summary for the target document from the anchor texts of the n groups with the highest relevance score, and concludes the language of T from the predominant source language.

Once anchor text processing is completed, the indexing component 142 generates an index, using the processed anchor text.

Figure 4:
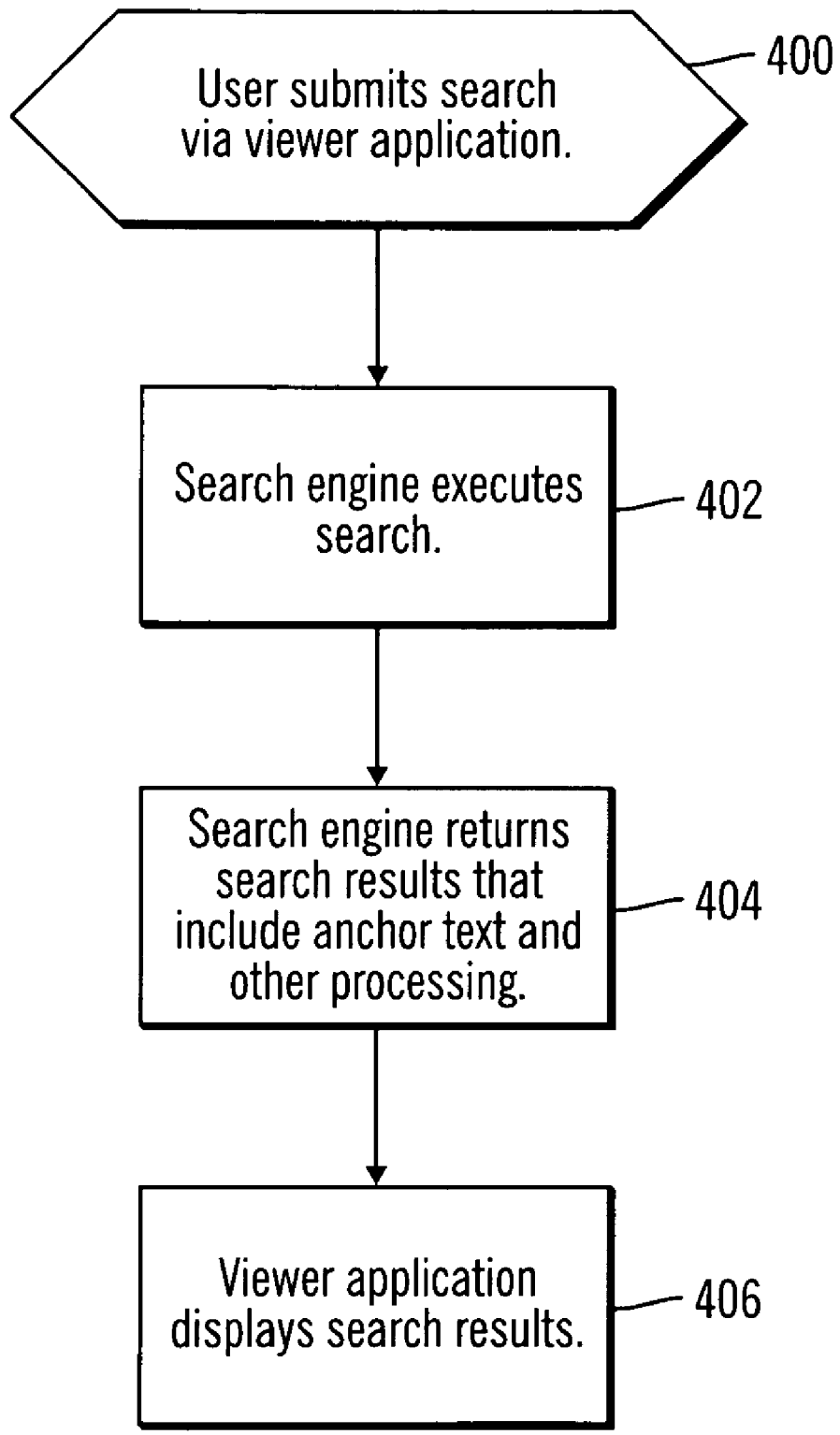
FIG. 4 illustrates logic for performing a document search in accordance with certain implementations of the invention.

FIG. 4 illustrates logic for performing a document search in accordance with certain implementations of the invention. Control begins at block 400 with a user submitting a search request via the viewer application 112. In block 402, the search engine 130 executes the search request. In block 404, the search engine returns search results that include the anchor text processing and other processing described in FIG. 2. In block 406, the viewer application 112 displays the search results.

Thus, certain implementations of the invention provide a technique for generating high-quality context information for search result items from a collection of anchors. In certain implementations, an analysis of each document is performed to identify the language in which the document was written, a global analysis of all documents is performed to assign a static rank to each document, and anchors are sorted by target document to obtain for each target document a logical collection of all anchors that point to the target document. For each collection of anchors pointing to a target document, the following may be performed: analysis of the distribution of the languages of the source documents; pruning of anchors from the collection based on the language distribution; noise filtering based on stop word and URL detection; classification of each anchor according to the proximity of the source to the target; and, assigning of a weight to each proximity class. Additionally, each anchor may be scored based on linguistic analysis of anchor text of the anchor. Furthermore, relevance-ordering of remaining unique anchor texts (i.e., the same text can be on different anchors) may be performed based on the weighted sum of occurrences in each proximity class, the accumulated rank of all source documents, and the linguistic score of the text.

The results of the anchor text processing are high quality titles, summaries, and other contextual information (e.g, the most likely language for each target). For search results where the target document is not available, this context information may be displayed to the user. If the target document itself is available, the generated context information may be used to enrich the information gained from the target document (e.g., by finding similarities between the document and its anchors).

Additional Implementation Details

The described techniques for handling anchor text may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which various implementations are implemented may further be accessible through a transmission media or from a file server over a network. In such cases, the article of manufacture in which the code is implemented may comprise a transmission media, such as a network transmission line, wireless transmission media, signals propagating through space, radio waves, infra-red signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2, 3A, 3B, and 4 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2, 3A, 3B, and 4 may be implemented in software, hardware, programmable and non-programmable gate array logic or in some combination of hardware, software, or gate array logic.

Figure 5:
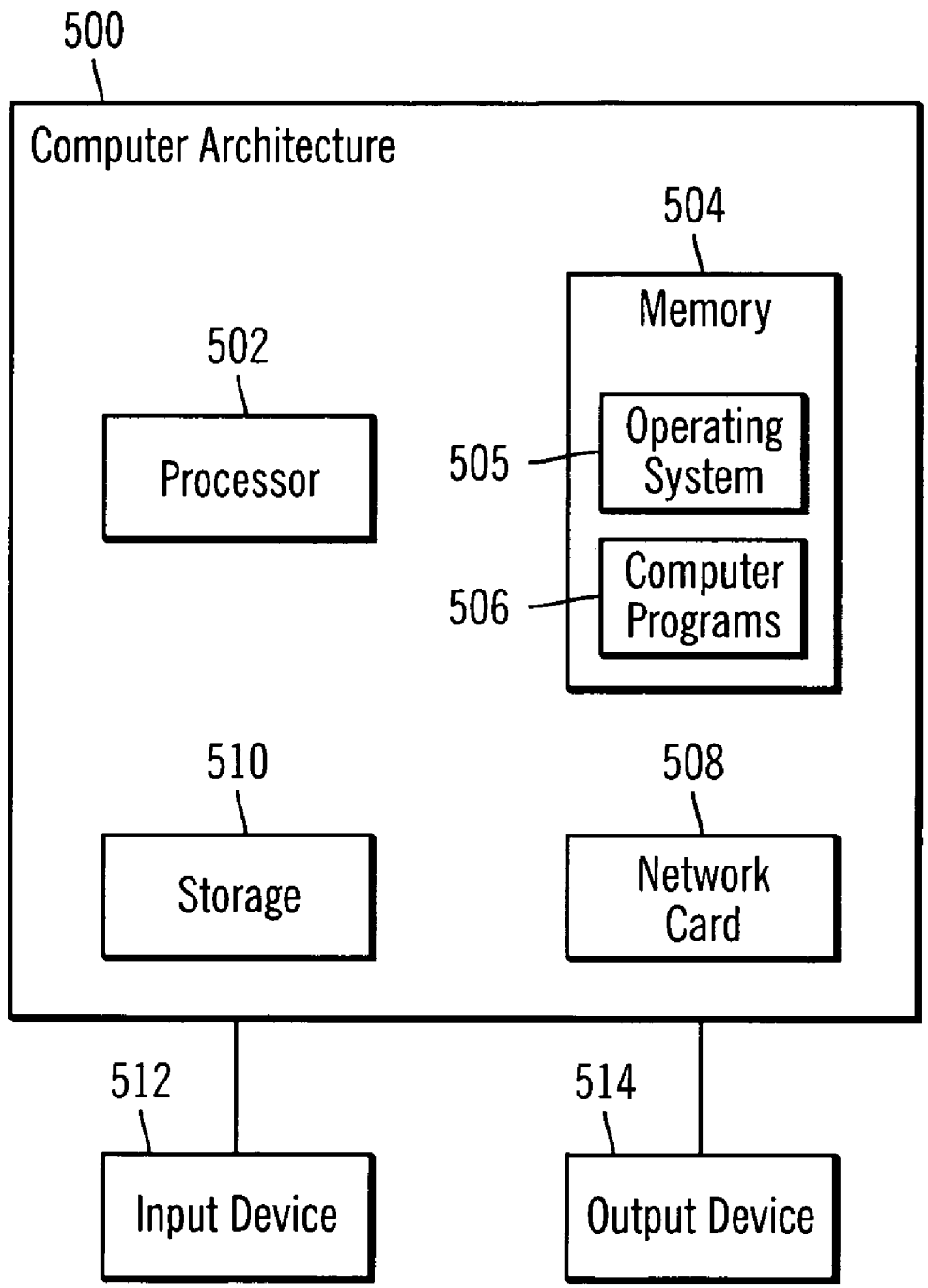
FIG. 5 illustrates an architecture of a computer system that may be used in accordance with certain implementations of the invention.

FIG. 5 illustrates an architecture of a computer system that may be used in accordance with certain implementations of the invention. For example, client computer 100, server computer 120, and/or operator console 180 may implement computer architecture 500. The computer architecture 500 may implement a processor 502 (e.g., a microprocessor), a memory 504 (e.g., a volatile memory device), and storage 510 (e.g., a non-volatile storage area, such as magnetic disk drives, optical disk drives, a tape drive, etc.). An operating system 505 may execute in memory 504. The storage 510 may comprise an internal storage device or an attached or network accessible storage. Computer programs 506 in storage 510 may be loaded into the memory 504 and executed by the processor 502 in a manner known in the art. The architecture further includes a network card 508 to enable communication with a network. An input device 512 is used to provide user input to the processor 502, and may include a keyboard, mouse, pen-stylus, microphone, touch sensitive display screen, or any other activation or input mechanism known in the art. An output device 514 is capable of rendering information from the processor 502, or other component, such as a display monitor, printer, storage, etc. The computer architecture 500 of the computer systems may include fewer components than illustrated, additional components not illustrated herein, or some combination of the components illustrated and additional components.

The computer architecture 500 may comprise any computing device known in the art, such as a mainframe, server, personal computer, workstation, laptop, handheld computer, telephony device, network appliance, virtualization device, storage controller, etc. Any processor 502 and operating system 505 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method being executable in a computer for processing anchor text, comprising:

forming a set of anchors that point to a target document, wherein each anchor is a path from a source document to the target document;

grouping together anchors with same anchor text, wherein each anchor is associated with anchor text;

computing a relevance score for each group, wherein computing the relevance score includes computing a linguistic score for each group; and generating context information for the target document based on the computed relevance score, wherein a title is composed from text of a group with a highest relevance score and a summary of the target document is composed from anchor texts of a number of groups with highest relevance scores.

2. The method of claim 1, further comprising:

determining a language of each document in a collection of documents;

determining rank of each document in the collection of documents; and determining a proximity class of each document in the collection of documents, wherein the proximity class specifies how close a source document is to the target document.

3. The method of claim 1, further comprising:

determining a predominant language in the set of anchors; and pruning anchors from the set that are not in the predominant language.

4. The method of claim 1, further comprising:

pruning anchors from the set that include at least a portion of a path to the target document.

5. The method of claim 1, further comprising:

pruning anchors based on a configurable set of words.

6. The method of claim 1, wherein computing the relevance score further comprises:

computing a weighted sum of occurrences for anchor text for anchors in each group, wherein a weight of each individual occurrence of the anchor text is determined by a proximity class of an anchor and a weight associated with that proximity class.

7. The method of claim 1, wherein computing the relevance score further comprises:

computing an accumulated rank for each group.

8. The method of claim 1, wherein computing the relevance score further comprises:

generating the relevance score for each group based on a weighted sum of occurrences, an accumulated rank, and a linguistic score.

* * * * *